Aug. 19, 1924.
A. WOLF
1,505,303
WEIGHING AND RECORDING DEVICE
Filed Nov. 27, 1922     2 Sheets-Sheet 1
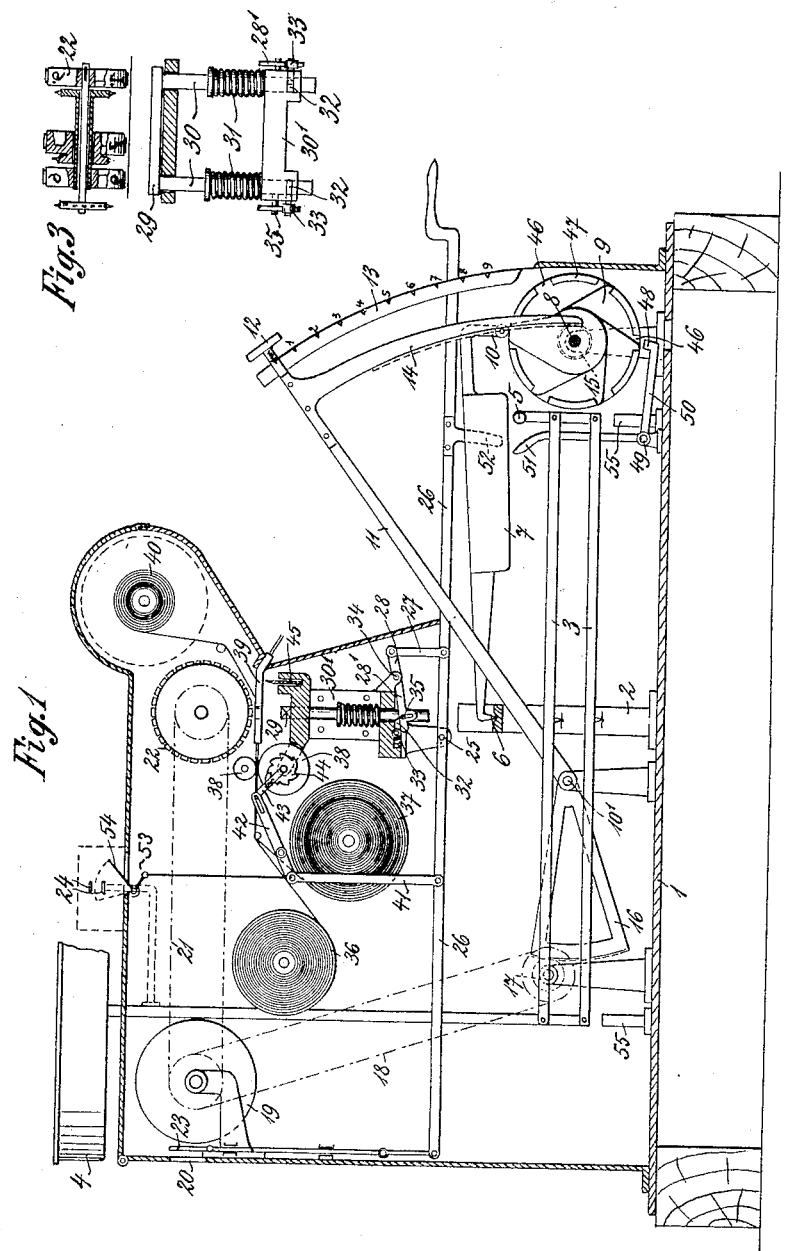
Inventor:
Arthur Wolf
by
Attorney.

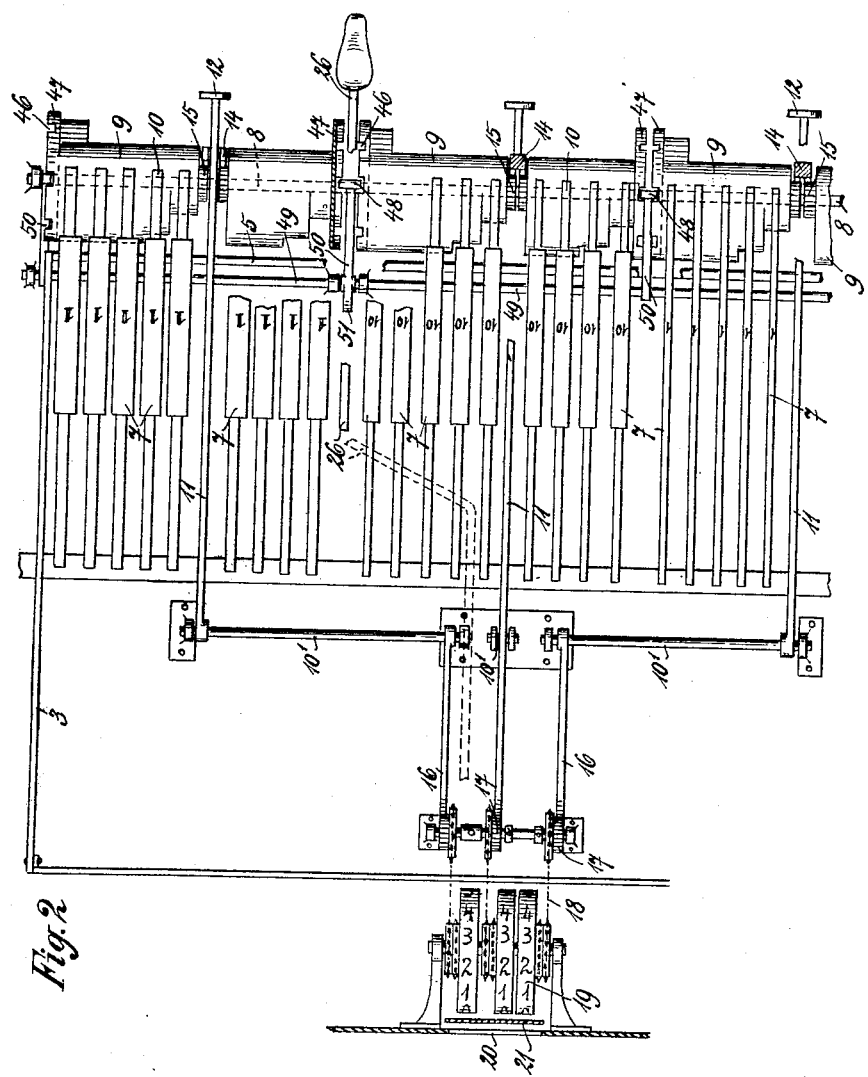

Patented Aug. 19, 1924.

1,505,303

UNITED STATES PATENT OFFICE.

ARTHUR WOLF, OF VIENNA, AUSTRIA.

WEIGHING AND RECORDING DEVICE.

Application filed November 27, 1922. Serial No. 603,653.

*To all whom it may concern:*

Be it known that I, ARTHUR WOLF, a citizen of the Czechoslovakian Republic, residing at Vienna, Austria, have invented certain new and useful Improvements in Weighing and Recording Devices, of which the following is a specification.

My invention refers to weighing devices and more especially to apparatus of the kind aforesaid provided with means for registering and recording the weight.

There are weighing devices in use, in which the weights are enclosed in a case and are normally held in an elevated position and engage on the scale beam through the action of corresponding keys, the weighing result being made visible on an indicator. This kind of weighing device has not proved efficient inasmuch as the construction and arrangement of the weights were not well chosen, in consequence of which scales used for greater weights had to be rather bulky. The principal drawback, however, connected with such weighing devices consists therein that the shopkeeper has no control as to the quantities that are weighed out, so that he is liable to suffer losses.

These deficiencies are avoided by the present invention, according to which the weights are represented by oscillatory levers held in an elevated position by supports and which are lowered by the action of the keybars, causing the corresponding weight lever to come to rest on a rail which is connected with the scale beam. Preferably the supports that hold the oscillatory weight levers in an elevated position are constructed as eccentric tappets or cam disks. By the action of the corresponding key-bar, they can be turned either singly or several at a time, thus causing the weight levers to act on the scale beam. The weight levers are preferably constructed as weighing units and the cam-discs of each group of weights (1 gram, 10 grams, 100 grams, 1 kilogram) are united to form one or several cylinders which are rotated through different angles by means of a single key-bar according to the extent of its motion, causing the single weight levers on the scale-beam to rest in succession.

The motion of the figure-cylinders that indicate the result of weighing is transmitted to a set of cylinders provided with printing type, which may be set accordingly so as to print the results on a slip of paper for the use of the shop-keeper. To protect him from losses when selling, the weighed out goods the device is constructed so that the seller is compelled to cause the printing appliance to act automatically when the result of weighing becomes visible in figures. At the same time the weighing appliance is locked so as to render any fraudulent handling of the weights impossible. To allow of further action of the weights the weighing appliance must first be unlocked, however at the same time the paper strip of the printing appliance is automatically set and ready for further use. Thus each sale is recorded automatically.

To improve the weighing appliance a cash register may be combined with it which causes the amounts to be indicated on the same paper that shows the weight of the goods sold.

In the drawings affixed to this specification and forming part thereof a device embodying my invention is illustrated diagrammatically by way of example.

In the drawings—

Fig. 1 is an elevation partly in section, viewed from within,

Fig. 2 is a partial plan, and

Fig. 3 is a front view of the printing device.

Referring to the drawing, on the bed-plate 1 the scale-beams 3 are arranged in bearings on standards 2. They carry at one end the scale 4 and at the other the rail 5, on which the weight lever 7 supported on edges 6 are caused to rest. The weight levers 7 represent the unit weights and are all equal in any group of weights. According to the invention they are held in an elevated position by a cam disc 9 revolving around a horizontal axle 8, the weight levers 7 resting on the circumference of the cam discs by means of the angular projections 10 which are provided for this purpose with small rolls at the end. In the construction shown on drawing the cam discs 9 of each group of weights are united to form two group cylinders. Each separate cam-disc cooperating with a separate weight lever is so shaped that within each group of weights every single weight lever acts on the scale-beam in succession with the others, according to the corresponding rotation of the cam-disc cylinders.

The combination of the cam-discs 9 into two cylinders within each group of weights is an improvement on the single cylinder system, because the diameter of the cam cylinder may be considerably smaller. For an angular movement of about 60° is available for the motion of the separate weight levers, whereas if there is only a single cylinder, at most $\frac{1}{10}$ of a revolution is available for each weight lever. In the latter case therefore, the inclined face of cam 9 which cooperates with the weight lever has to be much steeper, or else, to avoid this, the diameter of the cam cylinder must be larger.

The operation of both the cam cylinders of each group of weights is caused by a lever 11 oscillating around a horizontal axle 10, this lever carrying a key button 12, and being adjustable by means of a resilient cog on a scale 13 showing the figures 0 to 9. A toothed segment 14 attached to the key lever 11 cooperates with the driving wheels 15 arranged on adjoining faces of the cam cylinders of each group. As both the cam cylinders must only act one after the other when the key levers are moved, to bring the different weight levers to rest in succession on the scale-beam, the teeth of the toothed segments 14 which meet with the driving wheels 15 are arranged on the segment in staggered relation in such manner that when one tooth is in gear with the corresponding driving wheel, the other driving wheel is not influenced by the second tooth and vice versa.

A toothed segment 16 on the axis of oscillation 10 of each key lever 11 is in gear with a pinion 17, the rotation of which is transmitted to the figure wheel 19 by means of a chain which might be replaced by a rack or the like. The actual position of the figure wheel can be made visible through the opening 20.

The rotary motion of the figure wheel 19 is transmitted by means of a chain 21 to a set of wheels 22 provided with printing type, which print the weighing result on to a strip of paper. The opening 20 is normally closed by a screen 23 which, after the weighing out has been accomplished and the balance has come to a rest in the normal position indicated by the tongue 24, has to be opened by the salesman to show the customer the exact result of weighing, thus giving him an opportunity to control the weight. In order further to protect the shopkeeper from being cheated, the result of weighing is printed automatically at the moment it becomes visible to the buyer.

To this end there is provided a lever 26 swinging around a horizontal axis 25, and projecting through the front wall of the case with a handle fixed to its free end, while the rear end is coupled with the screen 23. A link 27 pivotally connects the lever with a rock arm 28 acting on the printing head which consists of a cross-head 29 (Figs. 1 and 3) arranged underneath the type-wheels 22 and guided by bolts 30 in a block $30^1$. The springs 31 strive to press the head 29 upwards, while two pawls 32 fitting into the lower guide-bar and gearing with corresponding notches of the bolts 30 tend to hold it down. Each of the pawls 32 is provided laterally with a small roller 33 contacting with the free end of an arm $28^1$. These arms are fixed to the axis 34 of the levers 28. The arms $28^1$ are slotted and embrace pins 35 fixed to the guide bolt 30 of the printing head.

When the key lever 26 is depressed by means of its handle, the screen 23 is raised and the exact result of weighing is made visible to the buyer. At the same time the rollers 33 and the pawls 32 are pressed outwards by the free ends of levers $28^1$ swinging upwards, in consequence of which they are disengaged from the guide bolts 30, causing the latter to be lifted by the springs 31 together with the printing head 29 which then cause the figures on the wheels 22 to be printed on the paper strip.

The result of weighing is printed on three strips. One of them is disposed on the roller 36, while the others are wound as a double band around roller 37, but might also be arranged on separate rollers. From these rollers the three strips of paper run through between a pair of feed rollers 38 into a guide sleeve 39, provided with a transverse slot facing the printing head and the type of the wheels 22 which is set for the printing operation. The single paper strip is guided upwards behind the the place where the printing is effected, through a slot in the guide sleeve 39, and is wound up on a roller 40, acted upon by a spring, according to the degree of feeding of the feed rollers 38. The rollers 40 with the different results of weighing printed on the strip serve as a control for the shopkeeper. The feed rollers 38 are actuated from lever 26 by means of a link 41 and a double armed lever 42 operatively connected with a pawl 43 cooperating with the ratchet wheel 44, which is coupled with the lower roller 38.

When lever 26 is raised again after printing, the screen 23 is lowered in front of the aperture 32, the printing device is forced downwards by the lever $28^1$ against the action of spring 31 until the pawls 32 enter the corresponding rests of the guide bolts 30. By this back movement of the key lever 26 the feed rollers 38 are rotated and the paper strips drawn forward.

A cutter 45 fixed in the block $30^1$ of the printing device is lifted by hand to cut off the two superposed paper strips, which project from the bent down end of the guide sleeve 39, after one or several weighing results have been printed. One slip goes to the buyer, the other one serves for controlling the salesman or the cashier.

To protect the shopkeeper against non-recorded weighing a device is provided which allows the weight levers to act only when the printing lever 26 is in an elevated position, so that the weighing results have to be printed and the paper strips drawn out before further operation of the device is possible.

To this end every cam roller bears a circular rim 47, with cut out portions 46. In the positions of a cam roller corresponding to the setting of the key lever 11 a cut out portion 46 of the rim 47 will face a tooth 48 of a rock lever 50 oscillating about a shaft 49 carrying an upright arm 51 the free end of which extends into the path of lever 26 and when pressed down is caused to rock by an arm 52 depending from the lever 26, thereby lifting the catch 48 which catches into the cut out portion 46 of the rim 47, so that the cam roller 9 is locked. When the printing lever 26 is lifted again, arm 52 releases the rock arm 51 and allows lever 50 to move downwards through its own weight. The catch 48 is withdrawn and an angular movement of the cam rollers 9 and an operation of the weight levers is rendered possible.

Preferably when the printing lever 26 is depressed, a bell is made to ring as a signal for the costumer that the weighing is done and that he can control the results through the aperture 20.

To protect the shopkeeper from fraudulent weighing if for instance the salesman should try to sell to a costumer below the real weight, provision may be made that the lever 26 can be fully depressed only when the tongues 24 of the scale are in perfect balance. Of course, a slight difference corresponding to the weight of 5 grams should be accounted for.

To this end a plate 54 can be brought into action through the lever 26 by means of the links 41 and 53. In the position of balance this plate is free to pass through below the tongue 24, which is preferably enclosed in a glass case while, when the tongues do not register, the plate will be held up by the lower one and will thus prevent the lever 26 from being pressed down any further.

The supporting of the weight levers by cam discs is not restricted to cases where they adopt the form of uniform weights, but also to cases where the single weights differ. In such a case the single cam discs are made to rotate by aid of separate keys or in any other suitable manner.

In order to allow speedy weighing buffers 55 are fixed to the base plate of case 1, underneath the scale-beam 3, such buffers allowing the scale-beam to swing only if there is a slight difference in weight, such as 10 grams.

For purposes of transport the scale is removed. By turning the eccentric tappets or cam discs the weight levers are lowered and come to rest on the cross bar of the scale-beam. To secure the weight levers in this position one or several rods are pushed into the case walls from outside above the levers and locked in place. The scale-beam may also be secured in a similar way.

I do not in general way desire to be limited to the exact details of construction shown and described, for obvious modifications will occur to a person skilled in the art.

I claim:—

1. A weighing and recording device comprising in combination, a scale-beam, a weight in the form of a rock arm, means for holding said weight in elevated position a key lever adapted to cause said weight to be lowered and to bear on said scale-beam and means, adapted to be operated by said key lever, for recording the weighing result.

2. A weighing and recording device comprising in combination, a scale-beam, a plurality of weights in the form of rock arms arranged in several groups of identical units, a cam disc for holding each weight in elevated position, the cam discs allotted to a group of weights being combined to form a cam cylinder and a key lever adapted to cause different angular movements of such cylinder whereby the single weights of said group are lowered and brought to bear on said scale-beam one after the other.

3. A weighing and recording device comprising in combination, a scale-beam, a weight in the form of a rock arm, means for holding said weight in elevated position, a key lever adapted to cause said weight to be lowered and to bear on said scale-beam, a toothed segment forming part of said key lever, a figure wheel and means comprising a gear wheel for transmitting motion from said segment onto said wheel.

4. A weighing and recording device comprising in combination, a scale-beam, a weight in the form of a rock arm, means for holding said weight in elevated position, a key lever adapted to cause said weight to be lowered and to bear on said scale-beam, a toothed segment forming part of said key lever, a figure wheel and a type wheel and means comprising a gear wheel for transmitting motion from said segment onto said wheels.

5. A weighing and recording device comprising in combination, a scale-beam, a weight in the form of a rock arm, means for holding said weight in elevated position, a key lever adapted to cause said weight to be lowered and to bear on said scale-beam, a toothed segment forming part of said key lever, a figure wheel and a type wheel, means comprising a gear wheel for transmitting motion from said segment onto said wheels and means for simultaneously displaying said figure wheel, operating said type wheel, printing the result with said type wheel and locking said key lever.

6. A weighing and recording device comprising in combination, a scale beam, a weight in the form of a rock arm, means for holding said weight in elevated position, a key lever adapted to cause said weight to be lowered and to bear on said scale-beam, a toothed segment forming part of said key lever, a figure wheel and a type wheel, means comprising a gear wheel for transmitting motion from said segment onto said wheels, a shutter displaceable in front of said figure wheel and a link operatively connecting said shutter with said key lever.

7. A weighing and recording device comprising in combination a scale beam, a weight in the form of a rock arm, means for holding said weight in elevated position, a key lever adapted to cause said weight to be lowered and to bear on said scale-beam, a toothed segment forming part of said key lever, a figure wheel and a type wheel, means comprising a gear wheel for transmitting motion from said segment onto said wheels, a shutter displaceable in front of said figure wheel, a printing stamp below said type wheel and operative connection between said shutter, said printing head and said key lever.

8. A weighing and recording device comprising in combination a scale beam, a weight in the form of a rock arm, means for holding said weight in elevated position, a key lever adapted to cause said weight to be lowered and to bear on said scale-beam, a toothed segment forming part of said key lever, a figure wheel and a type wheel, means comprising a gear wheel for transmitting motion from said segment onto said wheels, a shutter displaceable in front of said figure wheel, a printing stamp below said type wheel, operative connection between said shutter, said printing head and said key lever, a spring tending to force said printing head upwards and means, adapted to be displaced by said key lever, for locking said printing head in lowered position against the action of said spring.

9. A weighing and recording device comprising in combination a scale-beam, a weight in the form of a rock arm, means for holding said weight in elevated position, a key lever adapted to cause said weight to be lowered and to bear on said scale-beam, a toothed segment forming part of said key lever, a figure wheel and a type wheel, means comprising a gear wheel for transmitting motion from said segment onto said wheels, a shutter displaceable in front of said figure wheel, a printing stamp below said type wheel, operative connection between said shutter, said printing head and said key lever and a pawl and ratchet wheel feed mechanism for a strip to be fed past said type wheel.

10. A weighing and recording device comprising in combination, a scale beam, a weight in the form of a rock arm, means for holding said weight in elevated position a key lever adapted to cause said weight to be lowered and to bear on said scale-beam and means connected with said key lever for locking this latter, after it has been actuated, in all positions of the scale-beam excepting the position of substantial equilibrium.

11. A weighing and recording device comprising in combination, a scale beam, a rail connected to said scale-beam, a weight in the form of a rock arm, a cam disc for holding said weight in elevated position, a key lever adapted to cause said cam disc to be rotated so as to allow said weight to be lowered and to come to bear on said rail, and means for automatically locking said cam disc after each individual angular movement.

12. A weighing and recording device comprising in combination, a scale-beam, a rail connected to said scale-beam, a weight in the form of a rock arm, a cam disc for holding said weight in elevated position said cam disc being provided with indentures, a key lever adapted to cause said cam disc to be rotated so as to allow said weight to be lowered and to come to bear on said rail, a rock arm adapted to catch in indentures of said cam disc and an arm on said key lever adapted to carry said rock arm into operative position.

In testimony whereof I affix my signature.

ARTHUR WOLF.

Witnesses:
 CARL CONDINBURY,
 RUDOLPH MESFIAN.